(12) United States Patent
Eshghi et al.

(10) Patent No.: US 8,463,041 B2
(45) Date of Patent: Jun. 11, 2013

(54) WORD-BASED DOCUMENT IMAGE COMPRESSION

(75) Inventors: Kave Eshghi, Los Altos, CA (US); George Forman, Port Orchard, WA (US); Prakash Reddy, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 808 days.

(21) Appl. No.: 12/693,828

(22) Filed: Jan. 26, 2010

(65) Prior Publication Data

US 2011/0182513 A1 Jul. 28, 2011

(51) Int. Cl.
*G06K 9/34* (2006.01)
*G06K 9/18* (2006.01)
*G06F 7/00* (2006.01)

(52) U.S. Cl.
USPC .............................. 382/180; 382/182; 707/5

(58) Field of Classification Search
None
See application file for complete search history.

(56) References Cited

U.S. PATENT DOCUMENTS

| | | | |
|---|---|---|---|
| 5,539,841 A | 7/1996 | Huttenlocher | |
| 5,687,253 A | 11/1997 | Huttenlocher | |
| 5,825,919 A | 10/1998 | Bloomberg | |
| 6,275,610 B1 * | 8/2001 | Hall et al. | 382/180 |
| 6,839,680 B1 | 1/2005 | Liu et al. | |
| 2003/0101449 A1 | 5/2003 | Bentolila et al. | |
| 2006/0171588 A1 | 8/2006 | Chellapilla | |
| 2007/0118357 A1 | 5/2007 | Kasravi | |
| 2007/0237401 A1 | 10/2007 | Coath | |
| 2008/0126176 A1 | 5/2008 | Iguchi | |
| 2009/0210412 A1 * | 8/2009 | Oliver et al. | 707/5 |
| 2009/0263019 A1 | 10/2009 | Tzadok | |

OTHER PUBLICATIONS

Moses S. Charikar, "Similarity Estimation Techniques from Rounding Algorithms," Annual ACM Symposium on Theory of Computing, Proceedings of the thirty-fourth annual ACM symposium on Theory of computing, pp. 380-388 (2002).

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Informattion Systems, School of Computer Engineering, 2004.

Baynote Inc.: "The Collective Intelligent Platform," Online, http://www.baynote.com/technology/platform/ 2010.

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava, 2009.

(Continued)

*Primary Examiner* — Chan S Park
*Assistant Examiner* — Ha Le

(57) ABSTRACT

Locations of word images corresponding to words in a document image are ascertained. The word images are grouped into clusters. For each of multiple of the clusters, a respective compressed word image cluster is determined based on a joint compression of respective ones of the word images that are grouped into the cluster. The positions of the word images in the document image are associated with the respective ones of the compressed word image clusters corresponding to the clusters respectively containing the word images.

17 Claims, 5 Drawing Sheets

OTHER PUBLICATIONS

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B. Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why Wubat? Website USer Behavior & Analysis Tool, wubat, Online, http://www.wubat.com/.

Claypool et al.; "Implicit Interest Indicators", 14. Worcester Polytechnic Institute, Worcester, Computer Science Department Worcester Plytechnic Institute Worcester, MA 01609, USA., 2001.

Shahabi et al.; "A Framework for Efficient and Anonymous Web Usage Mining Based on Client-Side Tracking," 15. Univeristy of Southern California, Los Angeles, 2002.

Chattertrap: Online http://www.chattertrap.com; Jul. 20, 2010.

HSNW; SRI defense technology spawns civillian spplication: published Jun. 29, 2010.

Anthony Ha; Facebook investor backs Chattertrap, a personal assistant for content, Jun. 28, 2010.

* cited by examiner

WORD-BASED DOCUMENT IMAGE COMPRESSION

CROSS-REFERENCE TO RELATED APPLICATIONS

This application is related to U.S. patent application Ser. No. 11/830,841, which was filed on Jul. 30, 2007, and the entirety of which is incorporated herein by reference.

BACKGROUND

Many applications require images of text documents to be stored or transmitted. For example, many online content providers distribute a wide variety of different types of electronic content to subscribers, purchasers, and other users. Examples of such content include images of pages of print documents (e.g., books, magazines, and newspapers). Although the original, small-sized electronic source data files (e.g., PDF files) for such documents may be available for a limited number of print content, such source data files typically do not exist or are not available for the vast majority of print content. In these circumstances, the print documents are scanned and the resulting set of images are stored and distributed. While good algorithms exist for image compression, the resulting data files typically are very large. This tends to increase storage and transmission costs and tends to limit the potential market for such content to consumers who have devices that can work with such large files.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

DEFINITION OF TERMS

A "computer" is any machine, device, or other physical apparatus that processes data. Some types of computers process data according to computer-readable instructions that are stored on a computer-readable medium either temporarily or permanently. Example types of computers include server, desktop and portable computers, electronic book readers, personal digital assistants (PDAs), multimedia players, game controllers, mobile telephones, and pagers), image and video recording and playback devices (e.g., digital still and video cameras, VCRs, and DVRs), printers, and other embedded data processing environments (e.g., application-specific integrated circuits (ASICs)).

The terms "text" and "textual" refer to a logical arrangement of text elements (e.g., glyphs, characters, or symbols) of a written composition. Text may or may not be presented with divisions between logical aggregates (e.g., words) of the constituent text elements.

A "word image" is an image of a word of text, which typically includes a sequential arrangement of text elements, typically in reading order, along a line that may be straight or curved.

A "hash" refers to a characteristic data string (e.g., a bit vector) generated from a larger data vector. A "hash function" refers to a function that generates hashes in a systematic way from arbitrary input data vectors.

As used herein, the term "includes" means includes but not limited to, the term "including" means including but not limited to. The term "based on" means based at least in part on.

WORD-BASED COMPRESSION OF DOCUMENT IMAGES

The embodiments that are described herein provide systems and methods of compressing document images that leverage co-compression processes to take advantage of word repetitions that typically exist in documents, especially longer documents. These embodiments can represent a document image using a relatively small layout specification and a series of compressed word image clusters of duplicate words to achieve a significant degree of compression of the document image.

Figure 1:
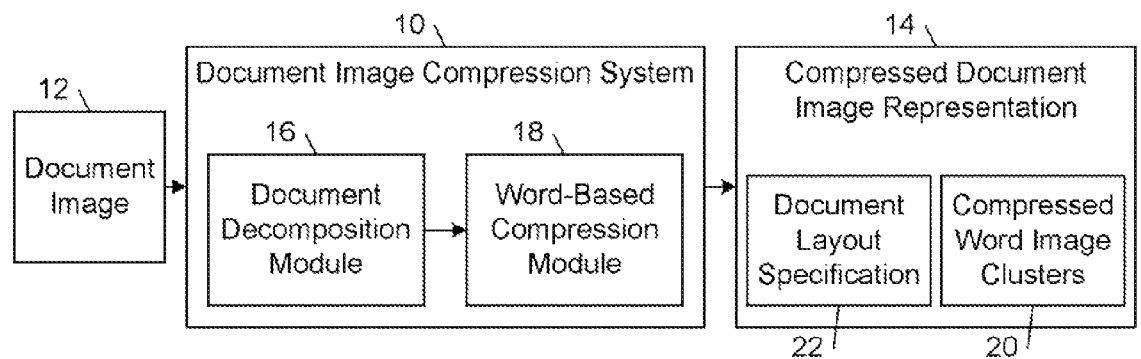
FIG. 1 is a block diagram of an example embodiment of a document image compression system that compresses a document image to produce a compressed document image representation.

FIG. 1 shows an embodiment of a document image compression system 10 that compresses a document image 12 to produce a compressed document image representation 14. The document image 12 may be any type of image that contains one or more words of text (e.g., a scanned image of a printed page of text). The document image compression system 10 includes a document decomposition module 16 and a word-based compression module 18.

In operation, the document decomposition module 16 decomposes the document image 12 to produce a decomposition specification that includes specifications of locations of word images in the document image 12. Based on the decomposition specification, the word-based compression module 18 ascertains locations of word images corresponding to words in the document image 12, groups the word images into clusters, and jointly compresses multiple word images in ones of the clusters to produce respective compressed word image clusters 20. The document image compression system 10 outputs the compressed word image clusters 20 and a document layout specification 22 that describes the associations between the positions of the word images in the document image 12 and representations of the corresponding word images in the compressed word image clusters 20 to create the compressed document image representation 14. In some embodiments, both the respective positions and the respective orientations (e.g., horizontal, vertical, or other orientation) of the word images are recorded in the document layout specification 22. In some embodiments, the document layout specification 22 and the compressed word image clusters 20 are integrated into a common data structure (e.g., an extended markup language (XML) data structure). In other embodiments, the document layout specification 22 and the compressed word image clusters 20 are embodied in separate data structures that are linked by internal references (e.g., pointers); these separate data structures may be stored or transmitted together or separately.

Embodiments of the document image compression system 10 may be implemented by one or more discrete modules (or data processing components) that are not limited to any particular hardware, firmware, or software configuration. In the illustrated embodiments, these modules may be implemented in any type of computer environment, including in digital electronic circuitry (e.g., an application-specific integrated circuit, such as a digital signal processor (DSP)) or in computer hardware, firmware, device driver, or software. In some embodiments, the functionalities of the modules of the document image compression system 10 are combined into a single data processing component. In some embodiments, the respective functionalities of each of one or more of the modules of the document image compression system 10 are performed by a respective set of multiple data processing components.

The document decomposition module 16 and the word-based compression module 18 may be co-located on a single apparatus or they may be distributed across multiple apparatus. If distributed across multiple apparatus, document decomposition module 16 and the word-based compression module 18 may communicate with each other over local wired or wireless connections, or they may communicate over global network connections (e.g., over the internet). In some example embodiments, the document decomposition module 16 and the word-based compression module 18 are located on a server computer that serves the compressed document image representation 14, in whole or in part, to a client terminal (e.g., a desktop computer or a portable computer, such as an eBook reader or a mobile telephone).

Figure 2:
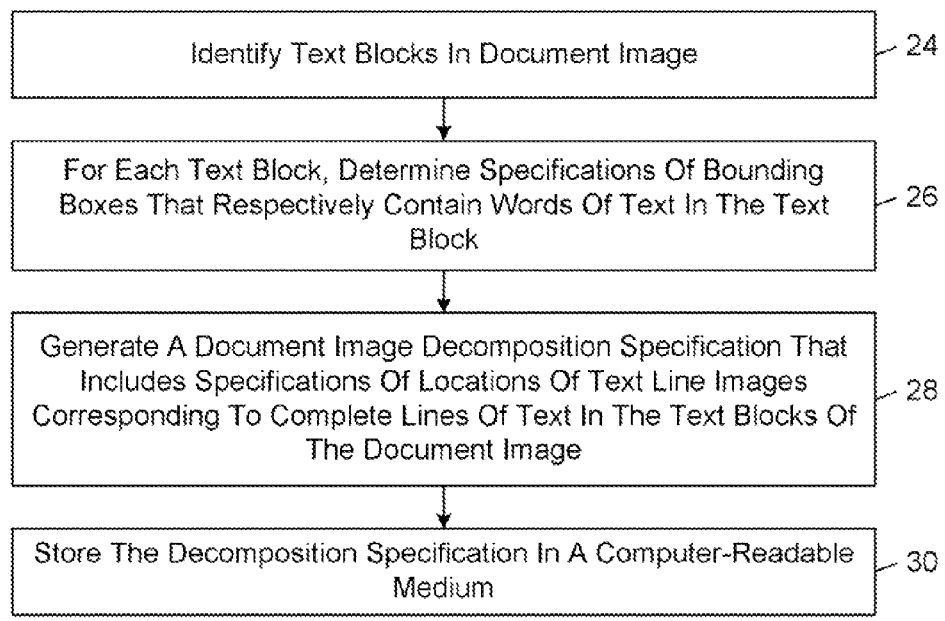
FIG. 2 is a flow diagram of an example embodiment of a method of decomposing a document image.

FIG. 2 shows a method by which the document decomposition module 16 decomposes the document image 12.

In accordance with the method of FIG. 2, the document decomposition module 16 identifies text blocks in the document image 12 (FIG. 2, block 24). For each text block, the document decomposition module 16 determines specifications of bounding boxes that respectively contain words of text in the text block (FIG. 2, block 26). In some embodiments, each bounding box corresponds to the smallest rectangle with vertical and horizontal sides that encompasses a word of text in a text block. The document decomposition module 16 generates a document image decomposition specification that includes specifications of locations of the determined word images corresponding to the words of text in the text blocks of the document image 12 (FIG. 2, block 28). The document decomposition module 16 stores the document image decomposition specification in a computer-readable medium (FIG. 2, block 30). In some embodiments, the document decomposition module 16 stores the document image decomposition specification in association with the document image 12.

In some embodiments, the decomposition specification is in the form of a data structure (e.g., a table or a list) that is stored on a computer-readable medium in an XML (eXtensible Markup Language) file format. The decomposition specification may be associated with the document image 12 in a variety of different ways. For example, in some embodiments, the decomposition specification may be incorporated into a metadata header of the document image data file. In other embodiments, the decomposition specification may be stored in a separate data file that includes a reference (e.g., a hyperlink or a uniform resource locator) to the document image 12.

In some embodiments, the document decomposition module 16 identifies text blocks in the document image 12 and determines specifications of bounding boxes that respectively contain words of text in the text block using any of a variety of different document decomposition processes that commonly are used in optical character recognition technology. Such processes typically include image binarization and text segmentation. The binarization process typically involves classifying image pixels as text or background based on adaptive thresholding and histogram analysis. The text segmentation process typically involves using connected components analysis or edge-based analysis to identify regions of text in the binarized image.

Figure 3:
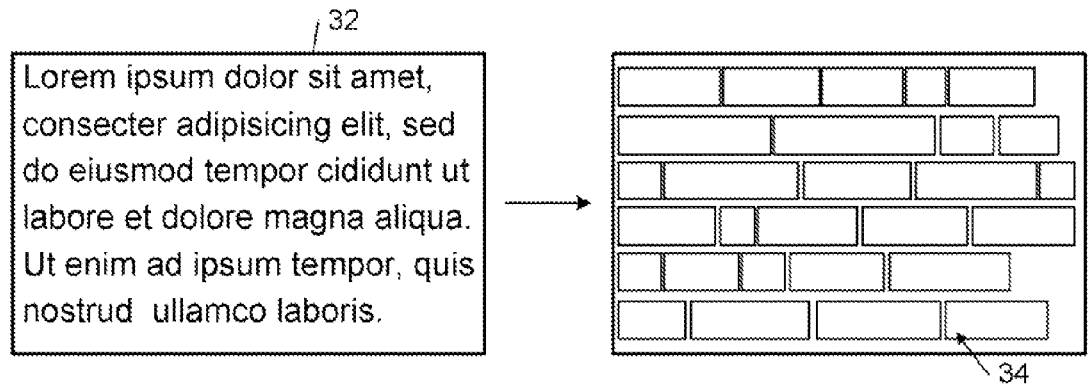
FIG. 3 is a diagrammatic view of an example text block and an associated set of bounding boxes of word images in the text block.

FIG. 3 shows an example text block 32 that has been decomposed by the document decomposition module 16 into a set of word bounding boxes 34 representing the locations of the determined word images corresponding to the words of text in the text block 32. The locations of the word images in the document image decomposition specification may be specified in a variety of ways. In some embodiments, the coordinates of the upper left and lower right corners of each word bounding box are used to specify the location of the corresponding word image.

Figure 4:
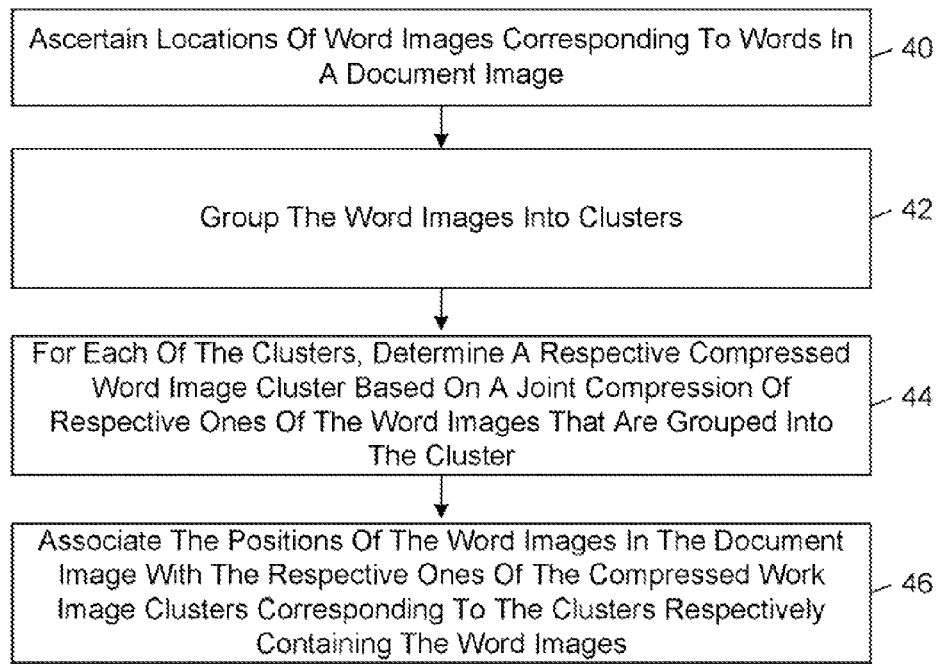
FIG. 4 is a flow diagram of an example embodiment of a word-based document image compression method.

FIG. 4 shows an example embodiment of a word-based document image compression method.

In accordance with the method of FIG. 4, the word-based compression module 18 ascertains locations of word images corresponding to words in a document image (FIG. 4, block 40). In the illustrated embodiments, the word-based compression module 18 ascertains these locations from the decomposition specification generated by the document decomposition module 16.

The word-based compression module 18 groups the word images into clusters (FIG. 4, block 42). The word-based compression module 18 typically clusters the word images based on similarities between the word images. In general, a wide variety of different image clustering processes may be used to cluster the word images. Each of the word image clusters typically will contain one or more word images corresponding to a single word (e.g., "of" or "the"). The number of word images in each word image cluster will depend on the number of times the corresponding word is repeated in the document image 12 and in the other pages of the document. Thus, word image clusters for less frequently used words are likely to contain only a single word image.

For each of the clusters, the word-based compression module 18 determines a respective compressed word image cluster based on a joint compression of respective ones of the word images that are grouped into the cluster (FIG. 4, block 44). Each compressed word image cluster is a data structure from which all the constituent images in the word image cluster can be re-created. In general, any of a variety of different joint image compression processes may be used to determine the compressed word image clusters, including vector quantization processes and transform coding processes. The joint compression process may be lossless or lossy depending on the desired word image reproduction fidelity level.

The document image compression system 10 associates the positions of the word images in the document image with the respective ones of the compressed word image clusters corresponding to the clusters respectively containing the word images (FIG. 4, block 46). In the illustrated embodiments, the document image compression system 10 generates the document layout specification 22, which describes the associations between the positions of the word images in the document image and representations of the corresponding word images in the compressed word image clusters 20.

As explained above, a wide variety of different image clustering processes may be used to cluster the word images. In some embodiments, the word images are clustered based on feature analysis.

Figure 5:
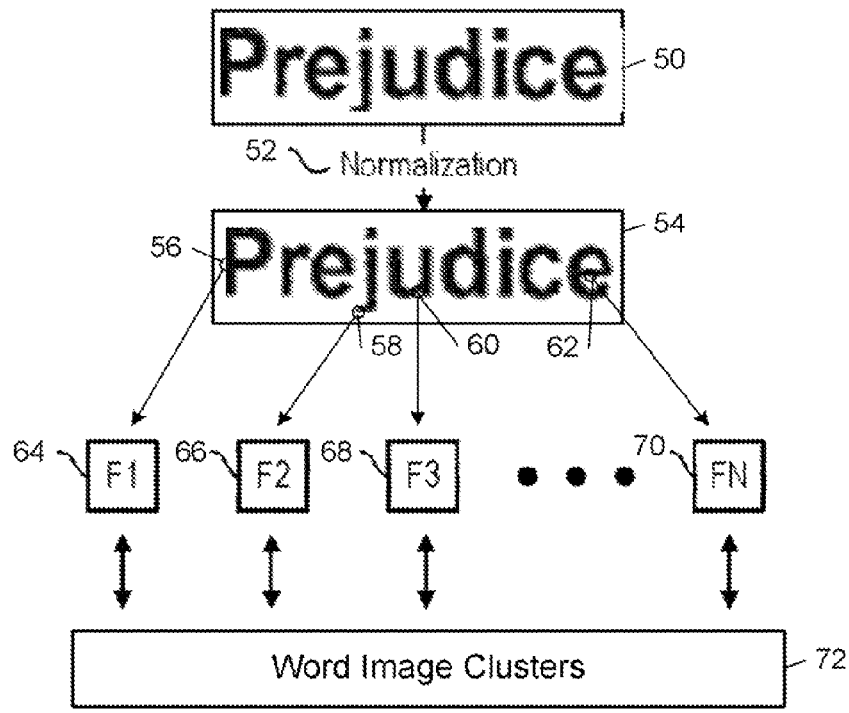
FIG. 5 is a diagrammatic view of an example of an embodiment of a method of grouping word images into clusters.

FIG. 5 shows an example of an embodiment of a feature-based method of grouping word images into clusters. In this method, each word image 50 is normalized 52 to produce a normalized word image 54. Keypoints 56-62 are identified in the normalized word images 54, and associated descriptor vectors are extracted from the normalized word images 54. A respective set of features 64-70 are determined for each word image 54 based on the extracted descriptor vectors. Although FIG. 1 shows an embodiment in which each feature is generated from only a single keypoint; in other embodiments, one or more of the individual features 64-70 are generated based on information from multiple keypoints. The word images 54 are grouped into word image clusters 72 based on comparisons of their respective sets of features 64-70.

In accordance with the method of FIG. 5, each original word image 50 is normalized 52 to a standard size (e.g., a size that is normalized to a standard height and a variable length that preserves the aspect ratio of the original word image) to produce a normalized word image 54. In general, a wide variety of different image normalization processes may be used to produce the normalized word image, including one or more of down-sampling, interpolation, intensity normalization, contrast normalization, and color balance normalization. In some embodiments, the normalization process is omitted altogether.

Keypoints 56-62 and associated descriptor vectors are extracted from the normalized word image 54 (or the original word image 50, if no normalization processing 52 has been performed) and used to generate a set of features 64-70. Any of a variety of different keypoint detection processes can be used, including a Laplacian-of-Gaussian (LoG) detector, a Harris corners detector, and a maximally stable extremal regions (MSERs) detector. In addition, any of a variety of different processes for generating the descriptor vectors can be used, including the Scale Invariant Feature Transform (SIFT) descriptor and any variant thereof (e.g., the Gradient Mirroring and/or Edge Precursors variants). In some embodiments, any or all of the following data are determined for each of the keypoints 56-62:

1. The (x, y) coordinates of the keypoint.
2. The keypoint descriptor, which typically is a mathematical object (such as a vector in n-dimensional space).
3. The keypoint orientation, which is an angle associated with the descriptor, typically relative to the x axis of the photograph, usually showing the direction of the maximum gradient of the pixel values.
4. The keypoint scale, which determines the granularity of the photograph information used for creating the keypoint. Higher scale uses coarser grain features, and smaller scale uses finer grain features. Scale typically also determines the size of the area around the keypoint that is encompassed by the descriptor.

Figure 6:
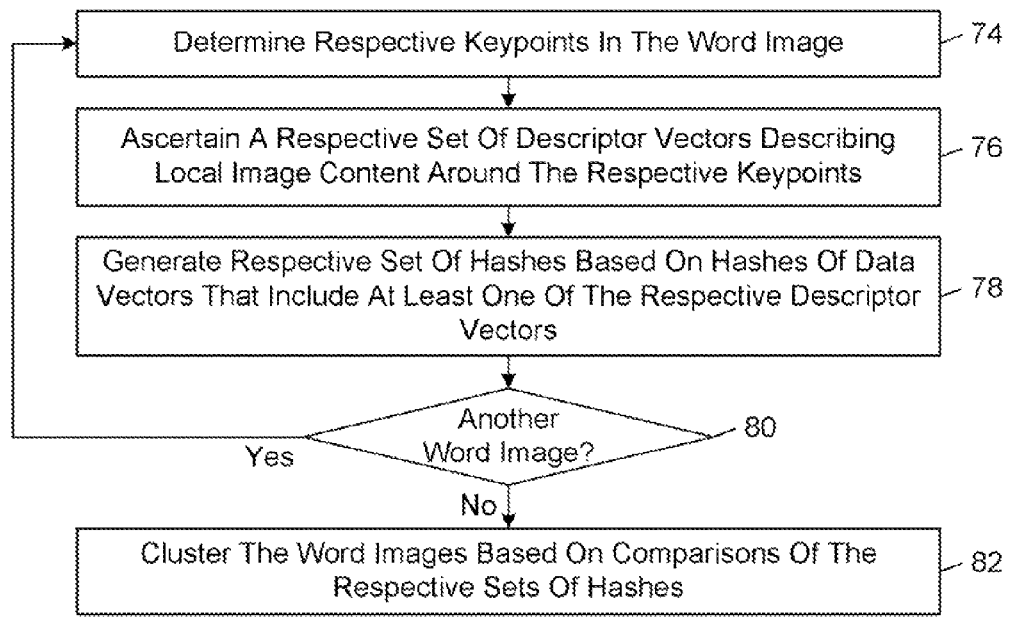
FIG. 6 is a flow diagram of an example of an embodiment of a method of grouping word images into clusters based on respective sets of hashes generated for the word images.

FIG. 6 shows an example of an embodiment of a method of grouping word images into clusters based on respective sets of hashes generated for the word images. In accordance with this method, the following processes are performed for each of the word images. Respectively keypoints are determined in the word image (FIG. 6, block 74). A respective set of descriptor vectors describing local image content around the respective keypoints is ascertained (FIG. 6, block 76). A respective set of hashes is generated based on hashes of data vectors that include at least one of the respective descriptor vectors (FIG. 6, block 78). If there is another word image (FIG. 6, block 80), the process is repeated for the next word image. Otherwise, the word images are clustered based on comparisons of the respective sets of hashes (FIG. 6, block 82).

In some embodiments of the method of FIG. 6, the individual features 64-70 are generated by calculating one or more hashes of data vectors that consist of or include the identified descriptor vectors. In this process, one or more n-dimensional vectors are extracted from each word image using a dimensionality reduction algorithm (e.g., principal component analysis (PCA)). These vectors are hashed using a locality sensitive hashing function (e.g., a concomitant rank order hash function). A respective set of hashes is generated for each word image, where the respective hash set characterizes the corresponding word image. In this way, if two word images are similar, their hash sets are likely to share some hashes, whereas if two word images are dissimilar, their hash sets are likely to be disjoint. In some of these embodiments, the degree of similarity of two word images is defined as the size of the intersection of their respective hash sets. This allows a sort-based hash clustering algorithm to be used to generate the word image clusters.

In block 78 of FIG. 6, a set of hash-based features is generated for the current word image being processed. In some embodiments, such features are based on hashes of data vectors that include at least one of the descriptor vectors. In some of these embodiments, each feature is a hash of a different one of the descriptor vectors, using the same hash function, so that the number of generated features is equal to the number of keypoints obtained for the current word image. In this process, each of the features is generated by using a hash function for which the probability that the hash of an arbitrary first vector matches the hash of an arbitrary second vector is a function of the angle between the first vector and the second vector (preferably, varying inversely with such angle).

In some embodiments, the hash function H takes as input a k-dimensional vector of real numbers and produces as output an n-dimensional vector of bits (0 or 1), where, if V and V' are two k-dimensional vectors of real numbers and h=H(V) and h'=H(V'), then for any i, $0 \leq i < n$, $$Pr(h[i] = h'[i]) = 1 - \frac{\theta(V, V')}{\pi},$$

where $\theta(V, V')$ is the angle between the two vectors V and V', and h(i) and h'[i] are the $i^{th}$ bits of h and h', respectively. Such a hash function H can be generated, e.g., in the following manner. First, n random vectors $\vec{r}_i$ are selected from the k-dimensional Gaussian distribution (i.e., each coordinate of each vector $\vec{r}_i$ being drawn from the 1-dimensional Gaussian distribution). Then, the hash function H is defined with respect to an arbitrary input vector V as:

$$h[i] = \begin{cases} 1 & \text{if } \vec{r_i} \square V \geq 0 \\ 0 & \text{if } \vec{r_i} \square V < 0. \end{cases}$$

Additional details regarding this has function can be found in, for example, Moses S. Charikar, "Similarity Estimation Techniques from Rounding Algorithms", STOC'02, May 19-21, 2002, Montreal, Quebec, Canada.

The foregoing hash function essentially requires n binary comparisons to selected (in this example, randomly selected) hyperplanes (i.e., each hyperplane being orthogonal to the corresponding vector $\vec{r}_i$). It is noted that for any of the hash functions H, as defined above, the probability of the hash values matching at any given bit position is approximately equal to cos θ(V, V'), which may be approximates as follows:

$$\cos\theta \approx 1 - \frac{\theta}{\pi}.$$

Another property of any of such hash functions H is that the Hamming distance between two hashes indicates the amount of the similarity between the original vectors (in this example, the descriptor vectors). In alternate embodiments, any other hash function that has this property instead is used.

In some embodiments, the word images are clustered based on a similarity measure that can be used to compare the respective sets of hashes (FIG. 6, block 82). In some embodiments, the following similarity measure is used to compare the respective sets of hashes generated for a pair of word images P, P' that are being compared:

$$sim(P, P') = \frac{|F \cap F'|}{|F \cup F'|},$$

where F is the feature set for a first word image P, F' is the feature set for a second word image P'.

Additional details regarding the identification of keypoints, the extraction of descriptor vectors, the generation of hashes, and the hash-based similarity measure that may be used in the clustering methods described in connection with FIGS. 5 and 6 may be obtained from U.S. patent application Ser. No. 11/830,841, which was filed on Jul. 30, 2007.

Once the clusters are identified, for each one of them a compressed word image cluster is computed (FIG. 4, block 44). A compressed word image cluster is a data structure from which all the word images in the cluster can be re-created. In some embodiments, for each of the clusters, successive ones of the word images are compressed to produce the respective compressed word image cluster. In this process, similarities between the successive word images can be leveraged to jointly encode word images as compared to processes that compress each of the word images individually. This results in a significant increase in the degree of compression that can be achieved.

In some of these embodiments, the joint compression of the word images in each word image cluster involves one or more of the following processes: encoding differences between the successive word images in producing the respective compressed word image cluster; applying a video compression process (e.g., MPEG) to the successive word images; and applying a run length encoding process to a bit stream derived from the successive word images in producing the compressed word image cluster. In many of these embodiments, the successive word images in each cluster are aligned before they are co-compressed.

An example embodiment of a word image cluster compression method involves the following processes. For each pixel position (e.g., coordinate X,Y) in each word image in a current word image cluster, create a string of bits [b1, b2, ... bn] where bi is 1 if the corresponding pixel at the pixel position in the r image is black, and 0 otherwise. Next, compress the bit string (e.g., by using run length encoding). Since the images are similar, the majority of the bits b1, b2, ... bn are equal, so bit string encoding process will significantly compress the string.

Referring back to FIG. 1, after the compressed word image clusters 20 have been determined, the document layout specification 22 is created for each cluster that reflects the layout of the original document, where for each word image that belongs to one of the clusters a reference is created to the compressed word image cluster for the word image. In general, the document layout specification 22 may be arranged in a wide variety of different ways. In the embodiments described above, each word image is assigned to a respective cluster, even where the respective cluster consists of only a single word image. In other embodiments, unique word images are recorded literally. This can be achieved, for example, by encoding compressed or uncompressed representations of these areas directly into the document layout specification or by including in the document layout specification 22 a reference to compressed or uncompressed representations of these areas.

Figure 7:
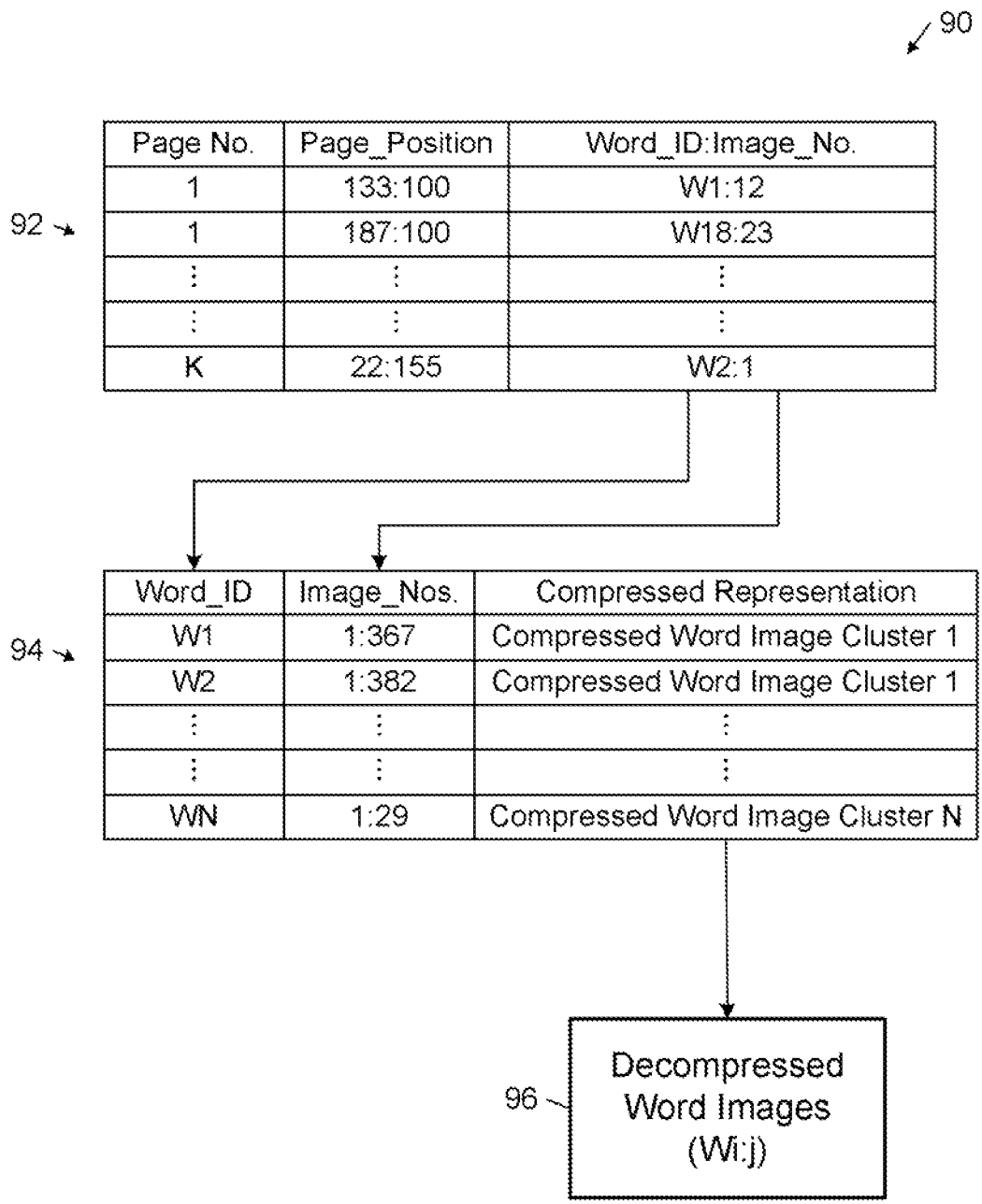
FIG. 7 is a diagrammatic view of an example of a document layout specification that associates word images with respective positions on pages of a document image and associates word images with respective compressed word image clusters from which respective word images can be extracted.

FIG. 7 shows an example of a document layout specification 90. In this embodiment, the document layout specification 90 includes a first data structure 92 that associates word images with respective positions on pages of a document image and a second data structure 94 that associates word images with respective compressed word image clusters from which respective word images can be extracted.

The first data structure 92 identifies the page number and location on that page where individual word images are to be placed in the reconstructed version of the document image. The position of the word images typically corresponds to the Cartesian (X,Y) coordinates of a pixel in a display area where a corner of the word image is to be placed. In the first data structure 92, each individual word image is identified by a respective Word_ID and a respective Image_No. The Word_ID identifies the compressed word image cluster from which the word image can be reconstructed and the Image_No. identifies the particular word image within the compressed word image cluster corresponding to the Word_ID. In this way, the Word_ID:Image_No. constitutes a pointer to a particular one of the word images in a particular compressed word image cluster that are indexed in the data structure 94.

The second data structure 94 provides a dictionary of all word images appearing the document image. In particular, the second data structure 94 associates the representation of each compressed word image cluster with a respective Word_ID and a respective range of Image_Nos. corresponding to the Image_No. identifiers of the word images in the associated with image cluster. Thus, for example, the reference to Word_ID:Image_No. equal to "W1:12" identifies a particular word image corresponding to the $12^{th}$ image in a sequence of word images that were jointly compressed to form compressed word image cluster W1 (i.e., Compressed Word Image Cluster 1), which may correspond to, for example, the word "of."

Thus, the first line in the data structure 92 specifies that the $12^{th}$ image of word W1 should be placed at a pixel location that is 133 pixels from the left edge of the display area and 100 pixels from the top edge of the display area. The 12$^{th}$ image of word W1 is indexed in the first row of the data structure 94, which specifies that the Compressed Word Image Cluster 1 corresponds to Word_ID:Image_No. given by W1:12. During reconstruction of the document image, the target word image 96 is retrieved by decompressing the corresponding compressed word image cluster.

The document layout specification and the associated compressed word image clusters may be stored or transmitted. In some embodiments, ones of the compressed word image clusters and a respective description of the associated positions of the corresponding ones of the word images in the document image are transmitted from a local network node to a remote network node (e.g., from a server network node to a remote client terminal). In some embodiments, in response to separate requests received from the remote network node for respective sets of the compressed word image clusters corresponding to different respective portions of the document image, the local network node transmits the respective ones of the determined sets of compressed word image clusters to the remote network node in separate responses. In some cases, the transmitting of the respective description is performed by the local network node in response to a first request received from the remote network node, and the transmitting of the ones of the compressed word image clusters is performed by the local network node in response to a second request received from the remote network node after the first request. In this way, the remote network node may request the needed compressed word images after receiving the document layout specification. Thus, instead of sending the compressed images as part of the requested sub document, the remote network node may request the needed compressed images based on the document layout specification. In some embodiments the server determines which words are going to be needed compared to the ones that have already been sent to the remote network node, and the server pro-actively transmits the needed clusters to the remote network node. The server dynamically determines which new word clusters need to be sent to the remote network node based on the recent transmission history to that particular remote network node and the words needed to reconstruct the next-to-be-viewed page In this way, the remote network node may demand one or more pages in whatever order and the server will send down the layout specifications for those pages and any new word clusters that are needed to reconstruct those pages.

On retrieval, the original document can be reconstructed from the document layout specification and compressed word image clusters. In this process, the images in each of the compressed word image clusters is decompressed and the decompressed word images 96 are laid out in a display area (e.g., a display area of a device or a designated area of a printed page) in accordance with the positions described in the document layout specification. Since the size of a reference is very small (e.g., a few bytes) compared with the size of a word image, and since there is a great deal of repetition of words in typical long documents, and since the size of a compressed word image cluster is significantly smaller than the sum of the sizes of the images in the original uncompressed cluster, the resulting data structure encoding the document layout specification and compressed word image clusters is much smaller than the original bit map representation, thereby achieving extremely good compression for the document image. The longer and more redundant a document, the greater the compression.

EXAMPLE OPERATING ENVIRONMENTS

In general, the document image compression system 10 typically includes one or more discrete data processing components, each of which may be in the form of any one of various commercially available data processing chips. In some implementations, the document image compression system 10 is embedded in the hardware of any one of a wide variety of digital and analog computer devices, including desktop, workstation, and server computers. In some embodiments, the document image compression system 10 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 8:
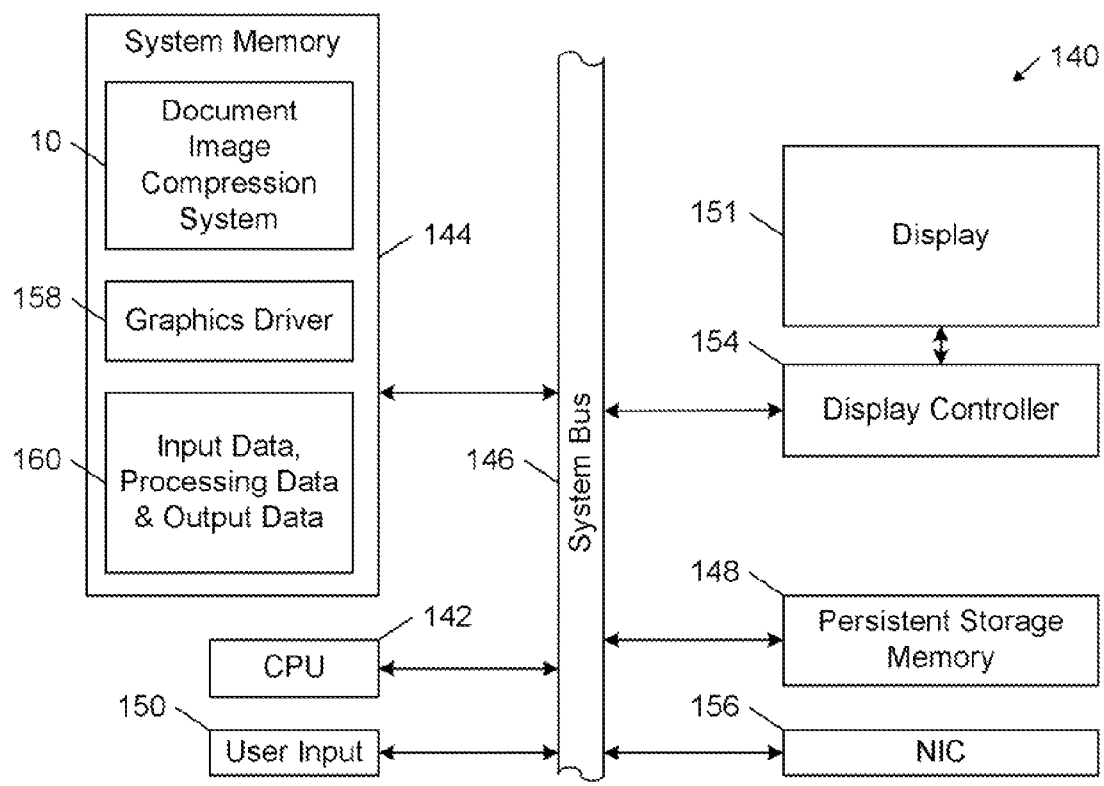
FIG. 8 is a block diagram of an example embodiment of a computer system that implements an embodiment of the document image compression system of FIG. 1.

FIG. 8 shows an embodiment of a computer system 140 that can implement any of the embodiments of the document image compression system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (N IC) 156.

As shown in FIG. 8, the system memory 144 also stores the document image compression system 10, a graphics driver 158, and processing information 160 that includes input data, processing data, and output data. In some embodiments, the document image compression system 10 interfaces with the graphics driver 158 (e.g., via a DirectX® component of a Microsoft Windows® operating system) to present a user interface on the display 151 for managing and controlling the operation of the document image compression system 10.

CONCLUSION

The embodiments that are described herein provide systems and methods of compressing document images that leverage co-compression processes to take advantage of word repetitions that typically exist in documents, especially longer documents. These embodiments can represent a document image using a relatively small layout specification and a series of compressed word image clusters of duplicate words to achieve a significant degree of compression of the document image.

Other embodiments are within the scope of the claims.

The invention claimed is:

1. A method, comprising:
    by a computer ascertaining locations of word images corresponding to words in a document image;
    by the computer grouping the word images into clusters;
    for each of multiple of the clusters, compressing successive ones of the word images to produce the respective compressed word image cluster based on a joint compression of respective ones of the word images that are grouped into the cluster,
    wherein compressing comprises encoding differences between the successive word images in producing the respective compressed word image cluster; and
    by the computer associating the positions of the word images in the document image with the respective ones of the compressed word image clusters corresponding to the clusters respectively containing the word images.

2. The method of claim 1, wherein the grouping comprises:
    for each of multiple of the word images, determining respective keypoints in the word images, ascertaining descriptor vectors describing local image content around the respective keypoints, and clustering the word images based on the descriptor vectors.

3. The method of claim 1, wherein the grouping comprises generating a respective set of hashes for each of multiple of the word images and clustering the word images based on comparisons of the sets of hashes.

4. The method of claim 3, wherein the generating comprises generating the respective set of hashes based on hashes of data vectors that comprise one or more respective descriptor vectors describing local image content around respective keypoints in the word images.

5. The method of claim 1, wherein the compressing further comprises applying a video compression process to the successive word images in producing the compressed word image cluster.

6. The method of claim 1, wherein the compressing further comprises applying a run length encoding process to a bit stream derived from the successive word images in producing the compressed word image cluster.

7. The method of claim 1, wherein the associating comprises:
    for each of the positions of the word images in the document image, associating the position with a respective one of the word images respectively contained in the compressed word image cluster associated with the position.

8. The method of claim 1, further comprising transmitting ones of the compressed word image clusters and a respective description of the associated positions of the corresponding ones of the word images in the document image.

9. The method of claim 8, further comprising: in response to separate requests received from the remote network node for respective sets of the compressed word image clusters corresponding to different respective portions of the document image, the transmitting comprises transmitting the respective ones of the determined sets of compressed word image clusters to the remote network node in separate responses.

10. The method of claim 8, wherein the transmitting of the respective description is performed in response to a first request received from the remote network node, and the transmitting of the ones of the compressed word image clusters is performed in response to a second request received from the remote network node after the first request.

11. The method of claim 8, further comprising determining a set of the compressed word clusters based on which of the compressed word clusters previously were sent to the remote network node and the ones of the compressed word clusters associated with respective positions in a document image requested by the remote network node.

12. A method, comprising:
    by a computer receiving a set of compressed word image clusters each comprising a joint compression of a respective cluster of word images;
    by the computer receiving associations between respective ones of the word images in the respective joint compressions of the compressed word image clusters and positions of respective ones of the word images in a document image;
    by the computer extracting the word images from respective ones of the compressed word image clusters, wherein the extracting comprises applying a run length decoding process to the compressed word image cluster to produce a bit stream, and deriving the successive word images from the bit stream;
    rendering a version of the document image based on the extracted word images and the associations between the compressed word image clusters and the positions of the word images in the document image.

13. The method of claim 12, wherein the extracting further comprises applying a video decompression process to the compressed word image cluster in producing the successive word images.

14. The method of claim 12, wherein the associations comprise, for each of the positions of the word images in the document image, associations between the position and a respective one of the word images respectively contained in the compressed word image cluster associated with the position; and the rendering of the version of the document image is based on the associations between the positions of the word images in the document image and the respective word images respectively contained in the compressed word image clusters associated with the positions.

15. The method of claim 12, wherein the rendering comprises rendering a version of the document image on a display.

16. Apparatus, comprising:
    a non-transitory computer-readable medium storing computer-readable instructions; and
    a data processor coupled to the computer-readable medium, operable to execute the instructions, and based at least in part on the execution of the instructions operable to perform operations comprising
    ascertaining locations of word images corresponding to words in a document image;
    grouping the word images into clusters;
    for each of multiple of the clusters, compressing successive ones of the word images to produce the respective compressed word image cluster based on a joint compression of respective ones of the word images that are grouped into the cluster,
    wherein compressing comprises applying a video decompression process to the compressed word image cluster in producing the successive word images; and associating the positions of the word images in the document image with the respective ones of the compressed word image clusters corresponding to the clusters respectively containing the word images.

17. At least one non-transitory computer-readable medium having computer-readable program code embodied therein, the computer-readable program code adapted to be executed by a computer to implement a method comprising:
ascertaining locations of word images corresponding to words in a document image;
grouping the word images into clusters;
for each of multiple of the clusters, compressing successive ones of the word images to produce the respective compressed word image cluster based on a joint compression of respective ones of the word images that are grouped into the cluster, wherein compressing comprises encoding differences between the successive word images in producing the respective compressed word image cluster; and
associating the positions of the word images in the document image with the respective ones of the compressed word image clusters corresponding to the clusters respectively containing the word images.

\* \* \* \* \*